United States Patent [19]

Elms et al.

[11] 4,186,036

[45] Jan. 29, 1980

[54] WELDABLE COATING COMPOSITIONS

[75] Inventors: William J. Elms, Lake Jackson; Steven A. Weitzel, Richwood, both of Tex.

[73] Assignee: The Dow Chemical Company, Midland, Mich.

[21] Appl. No.: 937,012

[22] Filed: Aug. 25, 1978

[51] Int. Cl.$^2$ .............................................. B44D 1/18
[52] U.S. Cl. ............................... 148/6.15 R; 148/6.2; 148/6.16; 148/31.5; 260/37 EP; 427/386; 427/388 A; 427/58; 428/416; 252/512; 528/103; 528/109; 528/94; 525/396
[58] Field of Search ......................... 148/6.15 R, 6.2; 427/386, 388 A; 260/37 EP, 830 TW, 47 EP; 428/472, 416; 252/512

[56] References Cited

U.S. PATENT DOCUMENTS

| | | | |
|---|---|---|---|
| 3,110,691 | 11/1963 | Fisher | 260/22 |
| 3,671,331 | 6/1972 | Malkin et al. | 148/6.2 |
| 3,687,894 | 9/1972 | Collings et al. | 260/47 EC |
| 3,738,862 | 6/1973 | Klarquist et al. | 427/390 |
| 3,819,425 | 6/1974 | De Ridder et al. | 148/6.16 |
| 3,849,141 | 11/1974 | Palm et al. | 148/6.2 |
| 3,907,608 | 9/1975 | Barrett et al. | 148/6.2 |
| 3,931,109 | 1/1976 | Martin | 260/47 EP |
| 3,970,482 | 7/1976 | Gunn | 148/6.2 |
| 3,990,920 | 11/1976 | De Ridder et al. | 148/6.2 |
| 4,020,220 | 4/1977 | Germano | 428/472 |

OTHER PUBLICATIONS

Kennedy, Zincrometal: Coil Coatings Answer to Corrosion, Modern Paint and Coatings, Sep. 1976, pp. 21-26.

*Primary Examiner*—Ralph S. Kendall
*Attorney, Agent, or Firm*—J. G. Carter

[57] ABSTRACT

An improvement in a weldable coating for metallic substrates containing a high molecular weight epoxy or phenoxy resin, an electroconductive pigment such as zinc and a diluent such as a glycol ether wherein the improvement resides in replacing at least about 70 weight percent of said resin with a composition containing a low molecular weight epoxy resin such as the diglycidyl ether of bisphenol A, a phenolic hydroxyl-containing compound such as a phenolic hydroxyl terminated adduct of a diglycidyl ether of a diphenolic compound such as bisphenol A and a catalyst for effecting the reaction between the epoxy resin and the adduct.

27 Claims, No Drawings

4,186,036

WELDABLE COATING COMPOSITIONS

BACKGROUND OF THE INVENTION

Industry is employing coated metals which are resistant to corrosion and are "weldable" i.e. electrically conductive to fabricate various articles. Such coatings are usually applied in two separate applications, the first being a coating containing a phosphate and/or a hexavalent chromium compound and an electroconductive pigment sometimes referred to as an undercoating followed by a second (top) coating as fully described in U.S. Pat. Nos. 3,067,045; 3,382,081; 3,395,027; 3,671,331; 3,687,739; 3,462,319; 3,819,425. Particularly for automobile applications, the second (top) coating provides a weldable system that must be capable of withstanding a slip or shear adhesive condition while still providing an adquate corrosion resistant, base for subsequent coating operations. As the metal is pressed, such as into a metal stamping die, it flows, while sometimes sliding and stretching, thereby subjecting the coating to shear. Coatings are tested as to their ability to withstand these operations by a test known as the "draw test".

SUMMARY OF THE INVENTION

It has now been discovered that an improved weldable coating composition can be employed without a previous undercoating composition containing an electroconductive pigment and still withstand the conditions subjected thereto by the "draw test" and also provide adequate metal corrosion protection.

The present invention concerns the following described improved coating composition.

In a weldable coating composition which comprises in admixture a high molecular weight epoxy or phenoxy resin, an electroconductive pigment and an inert diluent; the improvement which comprises replacing at least about 70, preferably from about 75 to about 100 percent by weight of said high molecular weight epoxy or phenoxy resin with a composition consisting essentially of:
(A) a low molecular weight epoxy resin or mixture of epoxy resins having an average of more than one vicinal epoxy group per molecule;
(B) a hydroxyl-containing material or mixture of such materials which is (1) a polyhydric phenolic or thiophenolic compound or (2) the product of reacting (a) a low molecular weight epoxy resin having an average of more than one vicinal epoxy group per molecule with (b) a polyhydric phenolic or thiophenolic compound or mixtures thereof wherein the phenolic hydroxyl or thiol to epoxy equivalent ratio is from about 2:1 to about 12:1 preferably from about 3:1 to about 8:1, most preferably from about 5.5:1 to about 6.5:1;
(C) a catalytic quantity of a catalyst for effecting the reaction between (A) and (B);
wherein (A) and (B) are present in quantities such that the phenolic hydroxyl or thiol to epoxy equivalent ratio is from about 0.5:1 to about 1.1:1, preferably from about 0.75:1 to about 1:1.

The present invention is also directed to a weldable coating composition comprising:
(A) a low molecular weight epoxy resin or mixtures thereof having an average of more than one vicinal epoxy group per molecule,
(B) a hydroxyl-containing material or mixture of such materials which is (1) a polyhydric phenolic or thiophenolic compound or (2) the product of reacting (a) a low molecular weight epoxy resin or mixtures thereof having an average of more than one vicinal epoxy groups per molecule with (b) a polyhydric phenolic or thiophenolic compound, or mixture of such compounds wherein the phenolic hydroxyl or thiol: epoxy equivalent ratio is from about 2:1 to about 12:1, preferably from about 3:1 to about 8:1 most preferably from about 5.5:1 to about 6.5:1;
(C) a catalytic quantity of a catalyst for effecting the reaction between (A) and (B);
(D) an electroconductive pigment;
(E) a diluent or solvent in an amount of from about 2% to about 40% preferably from about 5% to about 20% by weight based upon the weight of the total composition; and
wherein A and B are present in quantities such that the phenolic hydroxyl or thiol:epoxy equivalent ratio is from about 0.5:1 to about 1.1:1, preferably from about 0.75:1 to about 1:1 and the quantity of electroconductive pigment is from about 50 to about 90, preferably from about 80 to about 88 percent by weight based upon the combined weight of components (A), (B), (C) and (D).

The present invention also pertains to a method for applying a weldable coating composition to a metallic substrate which does not contain a pulverulent metal-containing precoating which method comprises:
(1) cleaning a non-precoated metal so as to remove grease, dirt and the like;
(2) applying to the resultant cleaned metal from step 1 a coating composition as described above; and
(3) heating the coated metal from step 2 at a sufficient temperature for a sufficient time to cure the coating.

Still another aspect of the present invention pertains to an epoxy resin mixture comprising
(1) from about 70% to about 95%, preferably from about 75% to about 90% and most preferably from about 87.5% to about 77.5% by weight of a low molecular weight epoxy resin or mixtures thereof having an average of more than one vicinal epoxy groups per molecule and
(2) from about 5% to about 30%, preferably from about 10% to about 20% by weight of a high molecular weight epoxy or phenoxy resin having a weight average moleclar weight of at least about 15,000, preferably at least about 30,000; and
wherein Component (2) is employed in a solvent or mixture of solvents, in quantities of from about 60% to about 85% solvent by weight of the combined weight of said Component (2) and said solvent.

DESCRIPTION OF THE PREFERRED EMBODIMENTS

The high molecular weight epoxy or phenoxy resins which are employed in weldable coatings are well known in the art as described in U.S. Pat. Nos. 2,506,486; 3,306,872; 3,379,684; 3,547,881; 3,637,590 and British Pat. No. 980,509 and allowed application Ser. No. 819,321 filed on July 27, 1977 by James A. Clarke entitled "Process for Preparing High Molecular Weight Polyether Resins From Bisphenols and Epoxy Resins".

Particularly suitable high molecular weigh epoxy or phenoxy resins include those having repeating units represented by the formula

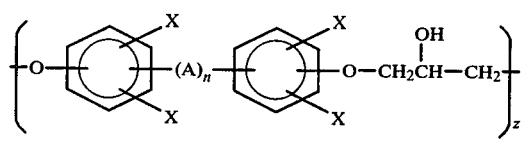

wherein within each repeating unit each X may be the same or different as well as being the same or different with regard to other units within the molecule and is selected from hydrogen, chlorine and bromine, A is divalent hydrocarbon group having from about 1 to about 12 carbon atoms,

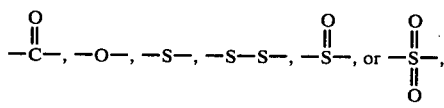

n has a value of zero or one, and z is a number such that the weight average molecular weight is at least about 30,000, preferably at least about 40,000.

Such high molecular weight epoxy or phenoxy resins are commercially available from The Dow Chemical Company as D.E.R. 684 EK40. Such resins are also commercially available from Shell Chemical Company as EPONOL 52 B-40, EPONOL 53 B-40, EPONOL 55 L-32, and also from Union Carbide Corporation as Bakelite Phenoxy Resins PKHA, PKHH and PKHC.

Suitable low molecular weight epoxy resins which can be employed herein include, for example, the diglycidyl ethers of dihydric phenols or hydrogenated dihydric phenols. Such epoxy resins can be represented by the formulas

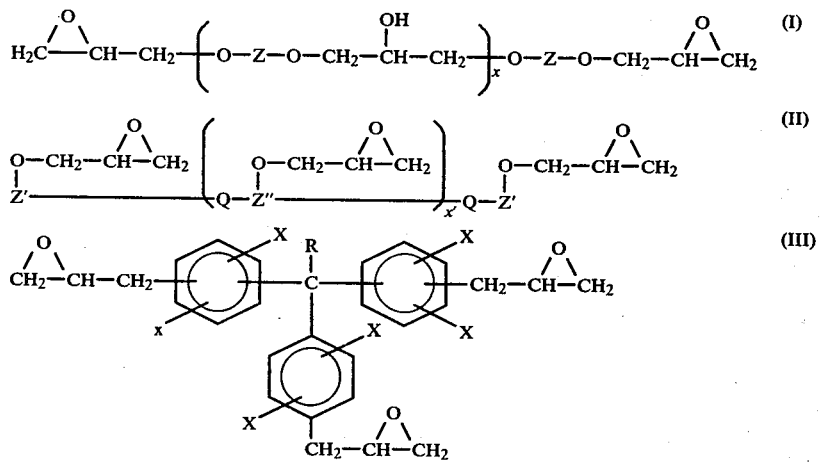

and wherein each Z is independently

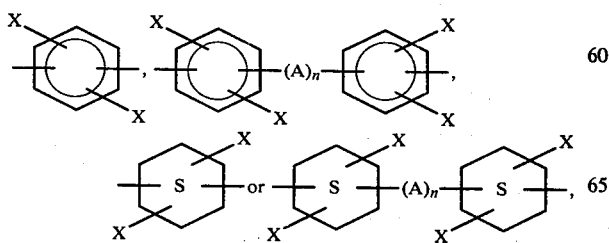

each Z' is independently

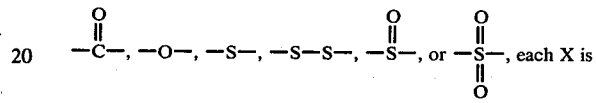

each Z'' is independently

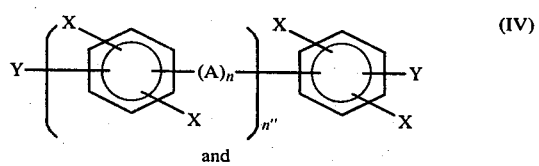

each Q is independently a divalent hydrocarbon radical having from 1 to about 6 carbon atoms, A is a divalent cyclic or acyclic hydrocarbon group having from about 1 to about 12 carbon atoms, $-\overset{O}{\underset{}{C}}-$, $-O-$, $-S-$, $-S-S-$, $-\overset{O}{\underset{}{S}}-$, or $-\overset{O}{\underset{O}{S}}-$, each X is independently hydrogen, chlorine or bromine; R is a hydrocarbon group having 1 to about 6 carbon atoms; n has a value of zero or one; x has an average value of from about 0 to about 4, preferably from about 0.02 to about 0.75, and x' has an average value of from about 0.1 to about 3, preferably from about 0.2 to about 1.8.

Also suitable for use in the present invention are the oxazolidinone modified aromatic or aliphatic based epoxy resins which contain both oxazolidinone groups and epoxy groups provided such modified epoxy resins contain more than one 1,2-epoxy groups. Suitable such oxazolidinone modified epoxy resins are disclosed in U.S. Pat. No. 3,687,897.

Suitable polyhydric phenolic or thiophenolic materials which can be employed in the present invention include, for example, those represented by the formulas

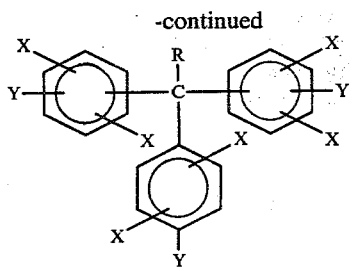

wherein A, X, R and n are as defined above, n" has a value of zero or 1 and Y is —OH or —SH.

Partially hydrogenated polyhydric phenolic materials are also suitable.

Particularly suitable hydroxyl-containing materials are the dihydric phenolic materials which include, for example, resorcinol, catechol, hydroquinone, 2,2-bis(4-hydroxyphenyl)propane commonly referred to as bisphenol A, 2,2-bis(4-hydroxyphenyl)methane, 2,2-bis(4-hydroxyphenyl)ethane, the halogen, particularly bromine, substituted derivatives thereof and the like. Also suitable are the corresponding thiophenolic compounds of the above, i.e. those wherein the —OH group has been substituted by an —SH group.

Also suitable are the polyhydric phenolic or thiophenolic materials represented by the formulas

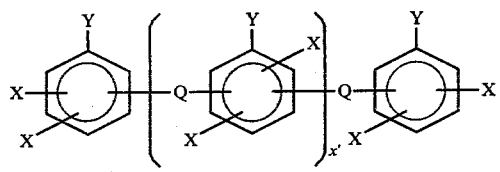

wherein Q, Y and x' are as defined above.

Suitable catalysts for effecting the reaction between the epoxy resin and the phenolic hydroxyl-containing or thiol-containing material include, for example, organic phosphonium compounds, ammonium compounds, imidazoles and the like.

The inorganic and organic phosphonium compounds which are employed in the present invention, as catalysts, include phosphonium salts of an acid, acid ester or ester of an element selected from the group consisting of carbon, nitrogen, phosphorus, sulfur, silicon, chlorine, bromine and iodine which are represented by the general formula:

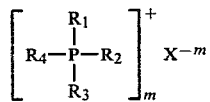

wherein $R_1$, $R_2$, $R_3$ and $R_4$ are independently selected from the group consisting of hydrogen, aliphatic hydrocarbon radicals containing from about 1 to about 20 carbon atoms, aromatic hydrocarbon radicals, alkyl substituted aromatic hydrocarbon radicals and radicals represented by the formula —$R_3$—Y wherein $R_3$ is an aliphatic hydrocarbon radical having from about 1 to about 20 carbon atoms and Y is a member selected from the group consisting of Cl, Br, I, $NO_2$, H and OH and where X is the anion portion of an acid, ester or acid ester of an element selected from carbon, nitrogen, phosphorus, sulfur, silicon, chlorine, bromine and iodine and wherein m is the valence of the anion X.

Particularly suitable catalysts include ethyltriphenyl phosphonium iodide, ethyltriphenyl phosphonium chloride, ethyltriphenyl phosphonium thiocyanate, ethyltriphenyl phosphonium acetate acetic acid complex, tetrabutyl phosphonium iodide, tetrabutyl phosphonium bromide, and tetrabutyl phosphonium acetate acetic acid complex.

These and other phosphonium catalysts are more fully described in U.S. Pat. Nos. 3,477,990, 3,341,580 and 3,948,855 which are incorporated herein by reference.

Suitable ammonium compounds include, for example, benzyltrimethyl ammonium chloride and tetramethyl ammonium hydroxide.

Suitable imidazoles which may be employed as catalysts in the present invention include, for example, 2-styrylimidazole, 1-benzyl-2-methylimidazole, 2-methylimidazole, 2-butylimidazole, mixtures thereof and the like. These and other suitable catalysts are disclosed in U.S. Pat. No. 3,634,323 and so much of that patent as it pertains to epoxy resins and advancement catalysts therefor are included herein by reference.

Other suitable catalysts include metal alkoxides such as, for example, aluminum diisopropoxide acetoacetic ester chelate, aluminum tri(sec-butoxide) and aluminum di(sec-butoxide)acetoacetic ester chelate which are commercially available from Chattem Chemicals as AIE-M, ASB and ASE-M respectively.

Suitable electrically conductive pigments include, for example, aluminum, copper, cadmium, steel, carbon, zinc, magnesium, magnetite, i.e., the magnetic oxide of iron, mixtures thereof and the like such as, for example a mixture of aluminum flake and zinc powder. Generally, the carbon pigments, e.g., channel blacks or furnace blacks, are the most finely divided of these electrically conductive pigments, often having particle size of 0.01 micron for the intensely black pigments. Comparatively, the finely divided aluminum powders have flake thickness for the finest grades of about 0.25 micron. These aluminum pigments can be typically produced by stamping, generally of small pieces of aluminum foil, or by ball milling atomized aluminum formed by air blasting a molten aluminum spray. Typically a finely divided zinc pigment is a distilled zinc dust or particles prepared by atomizing molten zinc in an air stream. Particle size for distilled zinc powders often average from about 2 to about 6 microns with generally about 99 weight percent or better passing a 240 mesh U.S. Standard Sieve.

Since these coatings generally are applied preparatory to subsequent welding of the substrate, they must contain a substantial amount of the electroconductive pigment, e.g., at least about 30 volume percent pigment and often more than about 65 percent by volume of particulate pigment, but on a weight basis, because of the density of the pigment, these coatings can contain up to about 90 weight percent of such pigment.

Suitable diluents or solvents include, for example, the oxygenated solvents such as acetone, methylethyl ketone, cyclohexanone, diacetone alcohol, mixtures thereof and the like, and the glycol ethers such as ethylene glycol, ethyl ether acetate; ethylene glycol, methyl ether; ethylene glycol, n-butyl ether; diethylene glycol, ethyl ether; diethylene glycol, n-butyl ether; propylene glycol, methyl ether; dipropylene glycol, methyl ether; mixtures thereof and the like and in some instances in admixture with aromatic solvents such as, for example, xylene, toluene, ethylbenzene and the like. Other suitable solvents include the halogenated solvents such as trichloroethylene, methylene chloride and the like.

Suitable such metallic substrates which can be employed herein include, for example, zinc, aluminum, and particularly the ferrous metals such as, for example, iron, tin-free steel, stainless steel, pickled steel, cool rolled steel and the like.

The method of the present invention is particularly suitable for the continuous coating of ferrous metals, particularly cold rolled steel, subsequently formed or stamped into automobile parts such as fenders, doors, sidepanels and the like and applicance housings such as washers, driers and the like.

The curing of the coatings employed herein will vary, depending upon the composition but will generally vary between from about 120° C. to about 300° C. preferably from about 175° C. to about 275° C. for a time sufficient to cure the coating, usually from about 30 sec. to about 30 min. preferably from about 90 sec. to about 180 sec. The actual temperature of the metal (peak metal temperature) most preferably should reach about 175° C. to about 250° C.

Before applying the coating compositions, the metallic substrates should be rendered free of foreign matter such as grease, oil, dirt and the like by treating or washing with suitable cleaning agents such as ketones, chlorinated solvents, alkaline cleaning compositions and the like. Such cleaning compositions include, for example, sodium metasilicate, sodium hydroxide, carbon tetrachloride, trichloroethylene, acetone, methyl ethyl ketone, aqueous trisodium phosphate-sodium hydroxide solution. Such substrates can also, if desired, be subjected to etching with a strong inorganic acid etching agent, such as, for example, hydrofluoric acid.

If desired, the substrates employed in the present invention may be precoated, after cleaning, with a pulverulent metal free composition containing chromate and/or phosphate ions such as those disclosed in U.S. Pat. Nos. 3,067,045; 3,382,081; 3,462,319; 3,395,027 and 3,687,739.

In some instances, it may be desirable to employ additives to the compositions of the present invention such as, for example, wetting agents, flow control agents, thixotropic agents, moisture absorbents or scavengers and the like.

The following examples are illustrative of the present invention and are not to be construed as to limiting the scope thereof in any manner.

PREPARATION OF ADDUCT A

Into a 1 liter glass reaction vessel equipped with means for stirring, temperature control and nitrogen purging were added:
176.5 pbw (0.980 equiv.) of a low molecular weight epoxy resin which is the diglycidyl ether of bisphenol A having an average epoxide equivalent weight (EEW) of 180 and an average repeating unit value of 0.07
323.5 pbw (2.83 equiv.) of bisphenol A
0.11 pbw of a 70% solution of ethyltriphenyl phosphonium acetate acetic acid complex in methanol.

The reactants were allowed to exotherm to a temperature of 160° to 170° C. after which the temperature was maintained at 150° C. for 2.5 hours.

The phenolic hydroxyl to epoxy equivalent ratio was 2.89:1.

The resultant adduct had a phenolic hydroxyl equivalent weight of 260. The adduct was then blended with 214.3 pbw of the methyl ether of propylene glycol (1-methoxy-2-propanol) hereinafter MEPG and 8.05 pbw of 2-methyl imidazole.

References hereinafter to adduct A refers to the reaction product of the epoxy resin and bisphenol A whereas references to adduct A solution refers to the mixture of adduct A with MEPG and 2-methyl imidazole.

PREPARATION OF ADDUCT B

An adduct was prepared as above employing the following components,
100 pbw (0.56 epoxide equiv.) of a low molecular weight diglycidyl ether of bisphenol A having an average EEW of 180 and an average repeating unit value of 0.07
400 pbw (3.51 phenolic hydroxyl equiv.) of bisphenol A
0.2 pbw of a 70% solution of ethyl triphenyl phosphonium acetate acetic acid complex in methanol.

The phenolic hydroxyl to epoxide equivalent ratio was 6.27:1.

The resultant adduct had a phenolic hydroxyl equivalent weight of 170 and was blended with 214.3 pbw of MEPG and 8.05 pbw of 2-methylimidazole.

References hereinafter to adduct B refers to the reaction product of the epoxy resin and bisphenol A whereas references to adduct B solution refers to the mixture of adduct B, MEPG and 2-methyl imidazole.

EXAMPLE 1

A mixture was prepared which contained
50 pbw (0.28 epoxide equivalents) of a diglycidyl ether of bisphenol A having an EEW of 180.
21.6 pbw of the ethyl ether of ethylene glycol (2-ethoxyethanol) hereinafter EEEG.
53.6 pbw of adduct A solution which corresponds to
37.09 pbw (0.14 phenolic OH equiv.) of adduct A
15.89 pbw of MEPG
0.62 pbw of 2-methyl imidazole The mixture had a phenolic hydroxyl to epoxy equivalent ratio of 0.5:1 and is designated as mixture A.

A weldable coating was then prepared by mixing in a high shear lab stirrer the following composition.
35.7 pbw of mixture A
5.0 pbw of EEEG
167.0 pbw of zinc dust which had an average particle size of 2 to 4 microns.

One of two unpolished, uncoated cold rolled steel 0.037"×4"×12" (0.094 cm×10.16 cm×30.48 cm) panels were cleaned with acetone and the other cleaned with a 10% aqueous solution of sodium hydroxide.

Each of the panels were then coated with the above prepared coating composition such that the coating thickness was about ½ mil (0.00127 cm) by means of a number 10 Meyer wire wound rod. Each of the panels were then baked in an oven at 275° C. for about 90 seconds. The resultant peak metal temperature was 210° C.

The panels were then subjected to the "draw test", Fisher Body Division of General Motors test method TM 47-18 dated 9/22/76, which is essentially described in U.S. Pat. No. 3,819,425, employing a die pressure of 2000 psi (140.6 kg/cm$^2$) and a speed of 2 in/min. (5.08 cm/min).

The panel which was cleaned with acetone retained 90% of the coating whereas the panel which was cleaned with the sodium hydroxide solution retained 40% of the coating after the second draw.

Another weldable coating composition was prepared employing the following components:

7.8 pbw of a 32% solution of a high molecular weight epoxy resin prepared from a diglycidyl ether of bisphenol A and bisphenol A having a weight average molecular weight of 30,000–35,000 in 2-ethoxyethyl acetate (hereinafter EEA) the resin hereinafter being referred to as HMW Resin A.
32.2 pbw of mixture A
5.0 pbw of EEEG
167.0 pbw of zinc dust.

This coating was applied to a 0.037×4"×12" (0.094 cm×10.16 cm×30.48 cm) unpolished, uncoated, cold rolled steel panel which had been washed with acetone and baked as previously described. The panel after being subjected to the "draw test" retained 60%–65% of the coating after the second draw.

EXAMPLE 2

A series of coatings were prepared by mixing in a high shear mixer, a low molecular weight diglycidyl ether of bisphenol A having an average EEW of 180 and an average repeating unit value of 0.07, adduct B, solvents and zinc dust having an average particle size of 2 to 4 microns. The coating compositions were coated onto 0.037"×4"×12" (0.094 cm×10.16 cm×30.48 cm) unpolished, uncoated, cold rolled steel panels which had been cleaned with methyl ethyl ketone to a thickness of ½ mil (0.00127 cm) with a number 10 Meyer wire wound rod. The panels were baked at 275° C. for 90 seconds and subjected to the draw test employing a die pressure of 2000 psi (140.6 kg/cm$^2$) and a speed of 2 inches/min. (5.08 cm/min). The compositions and results of the "draw test" after the second draw are given in the following Table I.

The phenolic hydroxyl to epoxy equivalent ratio was 0.98:1.

The coating was applied to a methyl ethyl ketone washed, unpolished, uncoated cold rolled steel 0.037"×4"×12" (0.094 cm×10.16 cm×30.48 cm) panel at a thickness of ½ mil (0.00127 cm) with a #10 Meyer wire wound rod. The coated panel was cured at 275° C. for 90 seconds. The panel was then subjected to the "draw test" and after the 2nd draw, the panel retained 60% to 65% of the coating.

A comparison of the above coating employing bisphenol A with the coatings of example 2 employing adducts of bisphenol A clearly demonstrates the unexpected improvement of employing the adduct instead of bisphenol A.

A comparison of the above coating employing bisphenol A with the comparative coating A prepared in Example 4 clearly indicates the unexpected improvement of employing a coating containing as the binder a mixture of a low molecular weight epoxy resin and bisphenol A instead of a coating containing as the binder a high molecular weight epoxy resin when applied to MEK washed cold rolled steel panels.

EXAMPLE 4

Coating compositions were prepared by high shear mixing the following compositions.

Coating A. (Comparative)

25 pbw of a high molecular weight phenoxy resin having a weight average molecular weight of 40,000 said resin being commercially available from Union Carbide Corporation as PKHH.
45.37 pbw of EEA
35 pbw EEEG
0.41 pbw calcium oxide (as a water scavenger)
167 pbw of zinc dust having an average particle size of

TABLE I

| Components | Panel A | Panel B | Panel C | Panel D | Panel E | Panel F | Panel G |
|---|---|---|---|---|---|---|---|
| Epoxy Resin | | | | | | | |
| pbw | 15.62 | 15.15 | 14.7 | 13.88 | 13.51 | 13.16 | 12.82 |
| epoxy equiv. | 0.087 | 0.084 | 0.082 | 0.077 | 0.075 | 0.073 | 0.071 |
| Adduct B | | | | | | | |
| pbw | 9.27 | 0.74 | 10.18 | 10.99 | 11.35 | 11.71 | 12.04 |
| phenolic OH equiv. | 0.055 | 0.057 | 0.060 | 0.065 | 0.067 | 0.069 | 0.071 |
| Phenolic OH:epoxy equiv. ratio | 0.627:1 | 0.682:1 | 0.73:1 | 0.84:1 | 0.89:1 | 0.944:1 | 1:1 |
| MEPG, pbw | 3.97 | 4.17 | 4.36 | 4.71 | 4.86 | 5.02 | 5.16 |
| EEEG, pbw | 11.69 | 11.48 | 11.3 | 10.95 | 10.79 | 10.63 | 10.49 |
| 2-methylimidazole, pbw | 0.15 | 0.16 | 0.16 | 0.18 | 0.18 | 0.19 | 0.19 |
| Zinc, pbw | 167 | 167 | 167 | 167 | 167 | 167 | 167 |
| % Coating retained on panel after double draw | 85–90 | 97–100 | 100 | 100 | 100 | 100 | 100 |

EXAMPLE 3

A coating was prepared which contained the following components.
15.4 pbw (0.086 equiv.) of a diglycidyl ether of bisphenol A having an average EEW of 180 and a repeating unit value of 0.07.
9.55 pbw (0.084 equiv.) of bisphenol A
9.55 pbw of MEPG
0.16 pbw of 2-methylimidazole
167 pbw of zinc dust having an average particle size of 2 to 4 microns.

2 to 4 microns.

Coating B. (An example of the present invention)

14.26 pbw (0.079 equiv.) of a low molecular weight epoxy resin which is a diglycidyl ether of bisphenol A having an average EEW of 180 and an average repeating unit value of 0.07.
15.28 pbw of adduct B solution which corresponds to 10.58 pbw (0.062 equiv.) adduct B 4.53 pbw of MEPG 0.17 pbw of 2-methylimidazole
11.16 pbw EEEG
0.41 pbw calcium oxide (as a water scavenger)

167 pbw zinc dust having an average particle size of 2 to 4 microns.

The phenolic hydroxyl to epoxy equivalent ratio was 0.785:1.

Coating C. (An example of the present invention)

7.8 pbw of HMW resin A
12.86 pbw (0.07 equiv. of a low molecular weight epoxy resin which is a diglycidyl ether of bisphenol A having an average EEW of 180 and an average repeating unit value of 0.07.
13.78 pbw of adduct B solution which corresponds to 9.54 pbw (0.06 equiv.) of adduct B 4.09 pbw of MEPG 0.15 pbw of 2-methylimidazole
10.55 pbw of EEEG
0.41 pbw of calcium oxide (as a water scavenger)
167 pbw of zinc dust having an average particle size of 2 to 4 microns.

The phenolic hydroxyl to epoxy equivalent ratio was 0.8:1.

Coating A was applied to 0.037"×4"×12" (0.094 cm×10.16 cm×30.48 cm) cold rolled steel panels precoated with a hexavalent chromium composition containing zinc commercially available from Diamond Shamrock Corp. as DACROMET 200.

Each of the coatings A, B and C were applied to methyl ethyl ketone (MEK) washed uncoated, unpolished cold rolled steel panels as in Examples 1 and 2.

Each of the above coated panels were baked at 275° C. for 90 seconds. The panels were then subjected to the draw test employing a die pressure of 2000 psi (140.6 kg/cm$^2$) and a speed of 2 in./min. (5.08 cm/min.).

The results of the "draw test" after the second draw are as follows:

|  | Dacromet Precoated | MEK Washed |
|---|---|---|
| invention | — | retained on panel |

The above example clearly demonstrates that the coating compositions of the present invention are as effective, if not better, when applied to panels which do not contain a precoating as compared to the prior art coating applied to panels which are precoated with a coating containing a pulverulent metal.

EXAMPLE 5

Coatings were prepared according to the present invention varying the levels of high molecular weight epoxy resin which can be employed in the present invention.

Coatings were prepared by the high shear mixing of various components as shown in Table II. The coatings were applied to methyl ethyl ketone washed unpolished, uncoated, cold rolled steel, 0.037"×4"×12" (0.094 cm×10.16 cm×30.48 cm), panels as in Example 2. The panels were then subjected to the "draw test" at a die pressure of 2000 psi (140.6 kg/cm$^2$) and a speed of 2 in/min (5.08 cm/min). The results are reported in Table II.

The epoxy resin employed in this example was a diglycidyl ether of bisphenol A having an average EEW of 180 and an average repeating unit value of 0.07. The zinc dust was the same as that employed in Example 3.

Coatings A thru D are examples of the present invention whereas Coatings E thru H are comparative experiments.

TABLE II

| Formulation | Coating A | Coating B | Coating C | Coating D | Coating E | Coating F | Coating G | Coating H |
|---|---|---|---|---|---|---|---|---|
| HMW Resin A | | | | | | | | |
| pbw solids | 2.11 | 4.51 | 6.02 | 8.99 | 12.0 | 13.5 | 15.01 | 20.99 |
| pbw EEA | 4.49 | 9.59 | 12.78 | 19.11 | 25.5 | 28.7 | 31.89 | 44.61 |
| Epoxy Resin, pbw | 15.94 | 14.54 | 13.70 | 11.98 | 10.26 | 9.43 | 8.55 | 5.11 |
| Epoxy equiv. | 0.089 | 0.081 | 0.076 | 0.067 | 0.057 | 0.052 | 0.048 | 0.028 |
| Adduct B | | | | | | | | |
| solution, pbw | 17.08 | 15.58 | 14.67 | 12.84 | 11.0 | 10.1 | 9.16 | 5.48 |
| Adduct B, pbw | 11.82 | 10.79 | 10.16 | 8.89 | 7.62 | 6.99 | 6.34 | 3.79 |
| Phenolic OH | | | | | | | | |
| equiv. | 0.07 | 0.063 | 0.06 | 0.052 | 0.045 | 0.041 | 0.037 | 0.022 |
| MEPG, pbw | 5.07 | 4.62 | 4.35 | 3.81 | 3.26 | 3.0 | 2.72 | 1.63 |
| 2-methylimidazole | 0.19 | 0.17 | 0.16 | 0.14 | 0.12 | 0.11 | 0.10 | 0.06 |
| EEEG, pbw | 6.88 | 6.28 | 5.92 | 10.18 | 9.43 | 9.07 | 8.69 | 7.21 |
| zinc dust, pbw | 170 | 170 | 170 | 170 | 170 | 170 | 170 | 170 |
| Equivalent ratio of Phenolic OH to epoxy groups | 0.787:1 | 0.778:1 | 0.786:1 | 0.781:1 | 0.786:1 | 0.791:1 | 0.777:1 | 0.796:1 |
| Amount of Components on a solvent free basis. | | | | | | | | |
| HMW Resin A | 7.06% | 15.11% | 20.15% | 30.11% | 40.16% | 45.12% | 50.2% | 70.22% |
| Epoxy Resin | 53.37% | 48.73% | 45.85% | 40.12% | 34.34% | 31.52% | 28.6% | 17.1% |
| Adduct B | 39.57% | 36.16% | 34.0% | 29.77% | 25.5% | 23.36% | 21.2% | 12.68% |
| Results of Double Draw test as % of coating retained after second draw unless otherwise indicated. | | | | | | | | |
|  | 100% | 100% | 100% | 40% | 0% | 0% | 0% | 0%* |

*after first draw

|  | Dacromet Precoated | MEK Washed |
|---|---|---|
| Panel A (comparative) | 80% coating retained on panel | 40% coating retained on panel |
| Panel B (present (invention) | — | 100% coating retained on panel |
| Panel C (present | | 100% coating |

EXAMPLE 6

Coating compositions were prepared at various levels of zinc.

The formulations were prepared with a high shear mixer and coated onto 0.037×4"×12" (0.094 cm×10.16 cm×30.48 cm) methyl ethyl ketone washed unpolished uncoated cold rolled steel panels. The formulations were coated as in example 1 and cured at 275° C. for 90 seconds. The panels were then subjected to the "draw test". The coating compositions and results of the "draw test" employing 2 draws are given in the following Table III. The epoxy resin and zinc dust were the same as that employed in Example 4. The draw test was employed at a die pressure of 2000 psi (140.6 kg/cm$^2$) and a speed of 2 in/min. (5.08 cm./min.).

Solvent EEA is 2-ethoxyethyl acetate.

Solvent EEEG is 2-ethoxyethanol (ethyl ether of ethylene glycol).

The Dacromet 200 and MEK surface treatments was the same as that described in Example 3. The NaOH surface treatment was the same as that described in Example 1.

The zinc dust was the same as that employed in the previous examples.

TABLE III

| Formulation | Coating A | Coating B | Coating C | Coating D |
|---|---|---|---|---|
| Epoxy resin, pbw | 14.26 | 14.26 | 14.26 | 14.26 |
| Equiv. | 0.079 | 0.079 | 0.079 | 0.079 |
| Adduct B, pbw | 10.58 | 10.58 | 10.58 | 10.58 |
| Equiv. | 0.062 | 0.062 | 0.062 | 0.062 |
| Equiv. ratio of phenolic OH to epoxy | 0.788:1 | 0.788:1 | 0.788:1 | 0.788:1 |
| MEPG, pbw | 4.53 | 4.53 | 4.53 | 4.53 |
| 2-methylimidazole, pbw | 0.17 | 0.17 | 0.17 | 0.17 |
| EEEG | 11.16 | 11.16 | 11.16 | 11.16 |
| Zinc dust | 153.6 | 167 | 183 | 202.3 |
| % of zinc dust on a solvent-free basis (i.e. as a % of total wt. of epoxy resin, addust B and zinc dust) | 86.06 | 87.05 | 88.05 | 89.06 |
| % Coating retained after second draw | 100 | 100 | 90 | 20 |

EXAMPLE 7

Various coating compositions were prepared and tested for corrosion resistance employing the salt fog test.

The coating procedures and panels were the same as that described in Example 4.

The high molecular weight epoxy resin HMW A was the same as HMW resin A described in Example 1.

The high molecular weight phenoxy resin HMW B had a weight average molecular weight of about 40,000 and is commercially available from Union Carbide Corporation as PKHH.

The epoxy resin employed was a diglycidyl ether of bisphenol A having an average EEW of 180.

The panels were each subjected to the salt fog test as described in ASTM B 117 for 240 hours. The panels were then evaluated for blistering according to ASTM D714-56 and for cross cut adhesion as described by H. A. Gardner and G. G. Sward, *PAINT TESTING MANUAL: PHYSICAL AND CHEMICAL EXAMINATION, PAINTS VARNISHES LAQUERS COLORS*, 12th Ed., 1962, Gardner Laboratory Inc., P. O. Box 5728, Bethesda, Maryland, page 160.

The coating compositions, surface treatment of the panels and results are given in the following Table IV.

TABLE IV

| | Coating A (Comparative) | Coating B | Coating C | Coating D | Coating E | Coating F | Coating G |
|---|---|---|---|---|---|---|---|
| HMW A (32% in EEA) | | | | | | | |
| Resin, pbw | 0 | 2.5 | 0 | 0 | 0 | 0 | 0 |
| EEA, pbw | 0 | 5.3 | 0 | 0 | 0 | 0 | 0 |
| HMW B (40% in EEA) | | | | | | | |
| Resin, pbw | 25 | 0 | 0 | 0 | 0 | 0 | 0 |
| Epoxy Resin, pbw | 0 | 12.88 | 14.28 | 13.88 | 14.28 | 13.16 | 12.82 |
| Adduct B, pbw | 0 | 9.65 | 10.71 | 10.99 | 10.71 | 11.71 | 12.04 |
| MEPG, pbw | 0 | 4.19 | 4.64 | 4.71 | 4.64 | 5.02 | 5.16 |
| 2-methylimidazole, pbw | 0 | 0.15 | 0.17 | 0.18 | 0.17 | 0.19 | 0.19 |
| EEEG, pbw | 35 | 10.54 | 11.14 | 10.95 | 11.14 | 10.63 | 10.49 |
| Zinc dust, pbw | 167 | 167 | 167 | 167 | 167 | 167 | 167 |
| Phenolic OH:epoxy ratio | — | 0.793:1 | 0.794:1 | 0.84:1 | 0.794:1 | 0.944:1 | 1:1 |
| Amount of Components On A Solvent Free Basis. | | | | | | | |
| HMW A | 0% | 9.99% | 0 | 0 | 0 | 0 | 0 |
| HMW B | 100 | 0 | 0 | 0 | 0 | 0 | 0 |
| Epoxy Resin | 0 | 51.46% | 57.14 | 55.81 | 57.14 | 52.92 | 51.57 |
| Adduct B | 0 | 38.55% | 42.86 | 43.98 | 42.86 | 47.08 | 48.43 |
| Surface Treatment | Dacromet | NaOH | MEK | MEK | NaOH | MEK | MEK |
| Results of Salt Fog Test | | | | | | | |
| Blistering | D#7 | M#9 | F-M#8 | M#8 | M#8-9 | M#8-9 | M#8 |
| Crosscut Adhesion (% Coating Retained) | 15-25 | 98 | 95 | 95 | 95-100 | 95-100 | 95-100 |

EXAMPLE 8

Coatings were prepared according to the present invention varying the epoxy resin which can be employed in the present invention.

Coating A 23.82 pbw (0.45 equiv.) a mixture consisting of (a) 81.3 wt % of a solid glycidyl ether of bisphenol A having an average EEW of 950–1050 and (b) 18.7 wt % of an epoxy novolac (phenol formaldehyde) resin having an average EEW of 176–181, and an average epoxy functionality of 3.2, said mixture having an average EEW of 525, predissolved to 50% non volatiles in 23.82 pbw of EEA.

8.86 pbw of Adduct B solution which corresponds to 6.20 pbw (0.365 equiv.) of adduct B 2.56 pbw of MEPG 0.10 pbw of 2-methylmidazole pbw of zinc dust having an average partical size of 2 to 4 microns.

The phenolic hydroxyl to epoxy equivalent ratio was 0.8:1.

Coating B 12.19 pbw (0.068 equiv.) of a low molecular weight epoxy which is a diglycidyl ether of bisphenol A having an average EEW of 180 and an average repeating unit value of 0.07.

2.43 pbw (0.014 equiv.) of a 3.6 functional epoxy novolac (phenol-formaldehyde) resin having an average EEW of 176.

15.05 pbw of Adduct B solution which corresponds to 10.42 pbw (0.061 equiv.) of adduct B 4.52 pbw of MEPG 0.17 pbw of 2-methylimidazole.

11.02 pbw of EEEG 167 pbw of zinc dust having an average particle size of 2 to 4 microns.

The phenolic hydroxyl to epoxy equivalent ratio was 0.74:1.

Each of the coatings A and B were applied to methyl ethyl ketone (MEK) washed uncoated, unpolished cold rolled steel panels as in Examples 1 and 2.

Each of the above coated panels were baked at 275° C. for 90 seconds. The panels were then subjected to the draw test employing a die pressure of 2000 psi (140.6 kg/cm$^2$) and a speed of 2 in./min. (5.08 cm/min.).

The results of the "draw test" after the second draw are as follows:

Panel A 80% coating retained on panel.
Panel B 80–85% coating retained on panel.

EXAMPLE 9

Further adducts were prepared to be used in the present invention.

Adduct C

Into a 1 liter glass reaction vend equipped with means for stirring temperature control and nitrogen purging were added:

50 pbw (0.278 equiv.) of a low molecular weight epoxy resin having an average EEW of 180 and an average repeating unit value of 0.07.

50 pbw (0.284 equiv.) of a 3.6 functional epoxy novolac (phenol-formaldehyde) resin having an average EEW of 176.

400 pbw (3.51 equiv.) of bisphenol A 0.2 pbw of a 70% solution of ethyl triphenyl phosphonium acetate acetic acid complex in methanol.

The reactants were allowed to exotherm to a temperature of 160° to 170° C. after which the temperature was maintained at 150° C. for 2.5 hours.

The phenolic hydroxyl to epoxide equivalent ratio was 6.25.1.

The resultant adduct was then blended with 214.3 pbw MEPG and 8.05 pbw of 2-methylimidazole and had an average equivalent weight of 170.

Adduct D

An adduct was prepared as above employing the following components:

100 pbw (0.56 equiv.) of a low molecular weight epoxy resin having an average EEW of 180 an average repeating unit value of 0.07.

380 pbw (3.33 equiv.) of bisphenol A 48.1 pbw (0.175 equiv.) of tetrabromobisphenol A 0.20 pbw of a 70% solution of ethyl triphenyl phosphonium acetate acetic acid complex in methanol.

The phenolic hydroxyl to epoxide equivalent ratio was 6.27:1.

The resultant adduct was blended with 226.3 pbw MEPG and 8.05 pbw 2-methyl imidazole and had an an average equivalent weight of 180.

EXAMPLE 10

Coating compositions were prepared with adducts C and D by high shear mixing the following compositions.

Coating A (An example of the present invention)

14.28 pbw (0.079 equiv.) of a low molecular weight epoxy resin having an average EEW of 180 and an average repeating unit value of 0.07.

15.30 pbw of Adduct C solution which corresponds to 10.60 pbw (0.062 equiv.) of adduct C 4.53 pbw of MEPG 0.17 pbw of 2-methylimidazole 11.12 pbw EEEG 167 pbw zinc dust having an average particle size of 2 to 4 microns.

The phenolic hydroxyl to epoxide equivalent ratio was 0.79:1.

Coating B (An example of the present invention)

14.28 pbw (0.079 equiv.) of a low molecular weight epoxy resin having an average EEW of 180 an an average repeating unit value of 0.07.

15.30 pbw of adduct D solution which corresponds to 10.60 pbw adduct D (0.06 equiv.) 4.54 pbw MEPG 0.16 pbw of 2-methylimidazole.

11.12 pbw EEEG 167 pbw zinc dust having an average particle size of 2 to 4 microns.

The phenolic hydroxyl to epoxide equivalent ratio was 0.76:1.

The coatings were applied to methyl ethyl ketone washed unpolished, uncoated, cold rolled steel, 0.037"×4"×12" (0.094 cm×10.16 cm×30.48 cm), panels as in Example 2. The panels were then subjected to the "draw test" at a die pressure of 2000 osi (140.6 kg/cm$^2$) and a speed of 2 in/min (5.08 cm/min).

The results of the "draw test" after the second draw were as follows:

Panel A 85% coating retained.
Panel B 90% coating retained.

EXAMPLE 11

Test strips coated with various coating compositions according to the present invention were prepared and spot welded.

The following compositions were prepared by high shear mixing:

Coating A 12.5 pbw (0.069 equiv.) of a low molecular weight epoxy resin which is a diglycidyl ether of bisphenol A having an average EEW of 180 and an average repeating unit value of 0.07.

13.4 pbw of adduct B solution which corresponds to 9.23 pbw (0.054 equiv.) Adduct B 4.02 pbw MEPG 0.15 pbw 2-methyl imidazole 9.9 pbw EEEG.

146.42 pbw zinc dust having an average particle size of 2 to 4 microns.

The phenolic hydroxyl to epoxy equivalent ratio was 0.78:1.

Coating B 6.60 pbw HMW resin A which corresponds to 2.11 pbw resin solids 4.49 pbw EEA 15.94 pbw (0.089 equiv.) epoxy resin which is a diglycidyl ether of bisphenol A having an average EEW of 180 and an average repeating unit value of 0.07.

16.89 pbw of adduct B solution which corresponds to 11.82 pbw (0.07 equiv.) Adduct B 5.07 pbw MEPG 0.9 pbw 2-methylimidazole 7.00 pbw EEEG 170.00 pbw zinc dust having an average particle size of 2 to 4 microns.

The phenolic hydroxyl to epoxy equivalent ratio was 0.79:1.

These formulations were applied to 0.037"×4"×12" (0.094 cm×10.16 cm×91.48 cm) methyl ethyl ketone washed unpolished, uncoated, cold rolled steel panels as in example 2. They were cured at 275° C. for 90 seconds. Film thickness was 0.4 to 0.6 mils.

The panels were then cut into 1"×4" (2.54 cm×10.16 cm) test strips, 4 strips from each panel.

Two test strips from each panel were placed with uncoated sides face to face and spot welded. Spot welding was performed with an MPS-10AFP pedestal mounted 230 volt spot welder manufactured by the Miller Electric Manufacturing Co., Appleton, Wisconsin. The welder was equipped with 18" tongs. 30 pounds air pressure was applied to air operated tong squeezer.

All spot welding was performed at an adjustable heat setting of 6 with a 2 second squeeze time and a 2 second weld duration time. Welding tips were filed clean after each test strip was welded.

Two spot welds were made on each strip approximately 2 inches (5.08 cm) apart. After welding, the second weld on each strip was pulled apart and the weld button diameter measured:

| | Weld Button Diameter |
|---|---|
| Coating A | 0.165"(0.419 cm) |
| Coating B | 0.175"(0.445 cm) |

We claim:

1. In a weldable coating composition for metallic substrates which comprises in admixture a high molecular weight epoxy or phenoxy resin, an electroconductive pigment and an diluent; the improvement which comprises replacing at least about epoxy or phenoxy resin with a composition consisting essentially of:
   (A) a low molecular weight epoxy resin or mixture of epoxy resins having an average of more than one vicinal epoxy group per molecule;
   (B) a hydroxyl-containing or thiol-containing material or mixture of such materials which is (1) a polyhydric phenolic or thiophenolic compound or (2) the product of reacting (a) a low molecular weight epoxy resin having an average of more than one vicinal epoxy group per molecule with (b) a polyhydric phenolic or thiophenolic compound wherein the phenolic hydroxyl or thiol to epoxy equivalent ratio is from about 2:1 to about 12:1;
   (C) a catalytic quantity of a catalyst for effecting the reaction between (A) and (B);
   wherein (A) and (B) are present in quantities such that the hydroxyl or thiol to epoxy equivalent ratio is from about 0.5:1 to about 1.1:1.

2. The coating composition of claim 1 wherein Components (A) and (B-2a) are glycidyl ethers of a polyhydric aromatic compound and Component (B) is the reaction product of Component (B-2a) with Component (B-2b) and wherein the substrate is a ferrous metal.

3. The coating composition of claim 2 wherein at least about 75 percent by weight of the high molecular weight epoxy and phenoxy resin is replaced and Components (B-1) and (B-2b) are phenolic hydroxyl-containing compounds.

4. The coating composition of claim 3 wherein Components (A) and (B-2a) are represented by the formula

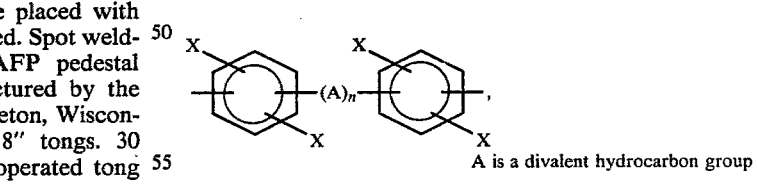

wherein Z is represented by the formula

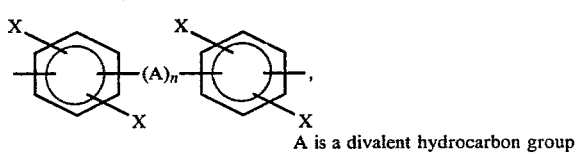

A is a divalent hydrocarbon group having from about 1 to about 12 carbon atoms,

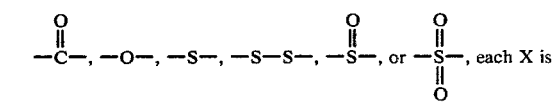

independently hydrogen, chlorine or bromine; n has a value of zero or one; x has an average value of from about 0 to about 4; the phenolic hydroxyl:epoxy equivalent ratio in Component (B) is from about 3:1 to about 8:1 and Components (A) and (B) are present in quantities such that the phenolic hydroxyl to epoxy equivalent ratio is from about 0.75:1 to about 1:1 and the electroconductive pigment is zinc.

5. The coating composition of claim 4 wherein the low molecular weight epoxy resin of Components (A) and (B-2a) are that wherein X is hydrogen, n is 1, x has an average value of from about 0.02 to about 0.75, A is

and the phenolic hydroxyl:epoxy equivalent ratio in Component (B) is from about 5.5:1 to about 6.5:1.

6. The coating composition of claim 5 wherein the epoxy resin of Component A and Component (B-2a) are the same; wherein Component (B-2b) is bisphenol A and Component (C) is 2-methylimidazole.

7. A weldable coating composition comprising:
(A) a low molecular weight epoxy resin or mixtures of thereof having an average of more than one vicinal epoxy group per molecule;
(B) a hydroxyl-containing or thiol-containing material or mixture of such materials which is (1) a polyhydric phenolic or thiophenolic compound or (2) the product of reacting (a) a low molecular weight epoxy resin having an average of more than one vicinal epoxy group per molecule with (b) a polyhydric phenolic or thiophenolic compound wherein the phenolic hydroxyl or thiol to epoxy equivalent ratio is from about 2:1 to about 12:1;
(C) a catalytic quantity of a catalyst for effecting the reaction between (A) and (B);
(D) an electroconductive pigment and;
wherein the equivalent ratio of phenolic hydroxyl or thiol groups in (B) to epoxy groups in (A) is from about 0.5:1 to about 1.1:1; and
(E) a diluent or solvent in an amount of from about 2% to about 40% by weight of the total composition.

8. The coating composition of claim 7 wherein Component (A), Component (B-2a) are glycidyl ethers of polyhydric aromatic compounds and Components (B-1) and (B-26) are phenolic hydroxyl-containing compounds.

9. The coating composition of claim 8 wherein Components (A) and (B-2a) are represented by the formula

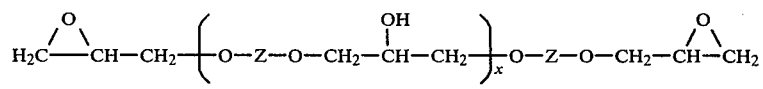

wherein Z is represented by the formula

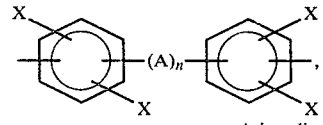

A is a divalent hydrocarbon group having from about 1 to about 12 carbon atoms,

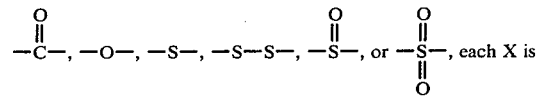

independently hydrogen, chlorine or bromine; n has a value of zero or one; x has an average value of from about 0 to about 4; the phenolic hydroxyl:epoxy equivalent ratio in Component (B) is from about 3:1 to about 8:1 and electroconductive pigment is zinc.

10. The coating composition of claim 9 wherein the phenolic hydroxyl:epoxy equivalent ratio in Component (B) is from about 5.5:1 to about 6.5:1 and Components (A) and (B) are present in quantities such that the phenolic hydroxyl to epoxy equivalent ratio is from about 0.75:1 to about 1:1, the electroconductive pigment is zinc and Component (B) is present in quantities of from about 5% to about 20%.

11. The coating composition of claim 10 wherein the low molecular weight epoxy resin of Components (A) and (B-2a) are that wherein X is hydrogen, n is 1, x has an average value of from about 0.02 to about 0.75 and A is

12. The coating composition of claim 11 wherein the epoxy resin of Component A and Component (B-2a) are the same; Component (B-2b) is bisphenol A and Component (C) is 2-methylimidazole.

13. The coating compositions of claims 7, 8, 9, 10, 11, or 12 which contain additionally up to about 25 weight percent based upon the weight of Components (A) and (B) of an epoxy resin or a phenoxy resin having a weight average molecular weight of at least about 15,000.

14. The coating composition of claim 13 wherein said epoxy or phenoxy resin has a weight average molecular weight of at least about 30,000.

15. A method for preparing a coated article which comprises applying to a metallic substrate a weldable coating, which process comprises:
(1) cleaning a non-precoated metallic substrate so as to remove grease, oil dirt and the like;
(2) applying to the resultant cleaned metal from step 1, a coating composition as described in claims 7, 8, 9, 10, 11 or 12 and optionally, additionally up to about 25 weight percent based upon the weight of Components (A) and (B) of an epoxy or phenoxy resin having a weight average molecular weight of at least about 15,000; and
(3) heating the coated metallic substrate from step 2 at a sufficient temperature for a sufficient time to cure the coating.

16. The method of claim 15 wherein said substrate is a ferrous metal and wherein said epoxy of phenoxy resin has a weight average molecular weight of at least about 30,000.

17. The method of claim 16 wherein said substrate is steel.

18. The method of claim 17 wherein in step (1) the substrate is also etched with an inorganic etching agent after said cleaning.

19. The method of claim 18 wherein an electroconductive pigment-free coating containing chromate and/or phosphate ions is applied between steps (1) and (2).

20. The method of claim 17 wherein an electroconductive pigment-free coating containing chromate and/or phosphate ions is applied between steps (1) and (2).

21. The method of claim 16 wherein in step (1) the substrate is also etched with an inorganic etching agent after said cleaning.

22. The method of claim 21 wherein an electroconductive pigment-free coating containing chromate and/or phosphate ions is applied between steps (1) and (2).

23. The method of claim 16 wherein an electroconductive pigment-free coating containing chromate and/or phosphate ions is applied between steps (1) and (2).

24. An article coated by the method of claim 15.
25. An article coated by the method of claim 17.
26. An article coated by the method of claim 19.
27. An article coated by the method of claim 23.

UNITED STATES PATENT AND TRADEMARK OFFICE
CERTIFICATE OF CORRECTION

PATENT NO. : 4,186,036  Page 1 of 2
DATED : January 29, 1980
INVENTOR(S) : William J. Elms, et al It is certified that error appears in the above-identified patent and that said Letters Patent are hereby corrected as shown below:

Column 3, line 12; insert --a-- in front of "divalent".

Column 5, line 60; delete the second occurrence of "about".

Column 7, line 7; change "cool" to --cold--.

Table II, last line under heading "Coating G"; insert --*-- after "0%".

Table III, third line from bottom under heading "Coating A"; change "86.06" to --86.08--.

Table IV, insert this line as shown under the line "Resin, pbw":

|  | Coating A (Comparative) | Coating B | Coating C | Coating D | Coating E | Coating F | Coating G |
|---|---|---|---|---|---|---|---|
| EEA pbw | 45.37 | 0 | 0 | 0 | 0 | 0 | 0 |

Column 15, line 19; insert --170-- in front of "pbw".

UNITED STATES PATENT AND TRADEMARK OFFICE
CERTIFICATE OF CORRECTION

PATENT NO. : 4,186,036     Page 2 of 2
DATED     : January 29, 1980
INVENTOR(S) : William J. Elms, et al It is certified that error appears in the above-identified patent and that said Letters Patent are hereby corrected as shown below:

Column 18, line 11; insert --70 percent by weight of said high molecular weight-- between "about" and "epoxy".

Column 18, line 37; change first occurrence of "and" to --or--.

Column 20, line 18; change "(B)" to --(E)--.

Column 20, line 66; change "of" to --or--.

Signed and Sealed this

Third Day of June 1980

[SEAL]

Attest:

SIDNEY A. DIAMOND

Attesting Officer     Commissioner of Patents and Trademarks